United States Patent
Alam et al.

(10) Patent No.: US 8,700,750 B2
(45) Date of Patent: Apr. 15, 2014

(54) WEB DEPLOYMENT FUNCTIONS AND INTERFACES

(75) Inventors: Bilal Alam, Sammamish, WA (US); Brian Delahunty, Seattle, WA (US); Clea H. Allington, Bellevue, WA (US); Madhur Joshi, Kirkland, WA (US); Nina N. Tang, Kirkland, WA (US); Kanwaljeet Singla, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1233 days.

(21) Appl. No.: 12/354,783

(22) Filed: Jan. 16, 2009

(65) Prior Publication Data

US 2010/0185582 A1    Jul. 22, 2010

(51) Int. Cl.
*G06F 15/177* (2006.01)
*G06F 7/00* (2006.01)

(52) U.S. Cl.
USPC .......................................... 709/221; 707/610

(58) Field of Classification Search
USPC .................................. 709/221; 707/609–639
See application file for complete search history.

(56) References Cited

U.S. PATENT DOCUMENTS

| | | | |
|---|---|---|---|
| 6,633,889 B2 | 10/2003 | Dessloch et al. | |
| 2002/0184360 A1* | 12/2002 | Weber et al. | 709/223 |
| 2005/0091240 A1* | 4/2005 | Berkowitz et al. | 707/100 |
| 2005/0251527 A1 | 11/2005 | Phillips et al. | |
| 2006/0080354 A1* | 4/2006 | Berger et al. | 707/103 R |
| 2007/0055709 A1* | 3/2007 | Jung et al. | 707/201 |
| 2007/0156872 A1 | 7/2007 | Stoyanova | |
| 2007/0198973 A1 | 8/2007 | Choi et al. | |
| 2008/0155509 A1* | 6/2008 | Ohta et al. | 717/127 |
| 2008/0163160 A1 | 7/2008 | Bloesch et al. | |
| 2008/0195628 A1 | 8/2008 | Kim et al. | |
| 2008/0216153 A1* | 9/2008 | Aaltonen et al. | 726/3 |
| 2009/0247134 A1* | 10/2009 | Jeide et al. | 455/414.2 |

OTHER PUBLICATIONS

"Microsoft Web Deployment Tool—Beta 1 Go Live—x64", retrieved at <<http://www.iis.net/downloads/default.aspx?tabid=34&g=6&i=1603>> Jun. 25, 2008, p. 3.
"Web + Object Integration", retrieved at <<http://www.objs.com/survey/web-object-integration.htm>> Oct. 16, 2008, pp. 1-54.
Rasputnis, Victor, "Deploy Your PowerBuilder Applications on the Web", retrieved at <<http://java.sys-con.com/node/42316>> Mar. 1, 2001, p. 7.
Villanueva, et al., "Web Service Deployment and Management Using the X-bone", <<Retrieved at http://www.isi.edu/div7/publication_files/web_service_deployment.pdf>>, Retrieved date: Oct. 15, 2008, 12 pages.

* cited by examiner

*Primary Examiner* — Jeong S Park
(74) *Attorney, Agent, or Firm* — Ben Tabor; Kate Drakos; Micky Minhas

(57) ABSTRACT

Described is a technology in which a destination machine (e.g., a server) is synchronized with source data via an API, including to configure the destination machine. The API includes functions for specifying the source data, the destination machine, and the deployment/synchronization type, along with a function for synchronizing the source data to the destination machine. The API allows combining content, configuration data and/or database data into a single unit (object). The API handles communication with a service/agent on the destination machine that configures that destination machine based on the source data. The API may include functions for packaging web applications, deploying web applications, synchronizing websites, deploying archive data, and/or deploying manifest data. In this manner, deployment/synchronization (including backup operations) may be performed against a group of objects using an API.

19 Claims, 6 Drawing Sheets

WEB DEPLOYMENT FUNCTIONS AND INTERFACES

CROSS REFERENCE TO RELATED APPLICATION

This patent application is related to U.S. patent application Ser. No. 11/943,600 filed Nov. 21, 2007, hereby incorporated by reference.

BACKGROUND

There are many tasks that network server administrators are required to handle. One task related to server management is ensuring that content, configuration data (e.g., settings) and other data stay synchronized between machines. Administrators also need to be able to take backups or snapshots of content and configuration data.

Web developers also face similar challenges in trying to deploy web applications to servers, including when they need to push content files, configuration data (e.g., IIS configuration data), assemblies, databases and other types of data to a server. At present, developers need to either copy the files manually, build an installer or write a custom process. Web developers also need to back up applications, and sometimes have to create a custom package that contains an application with its associated files, configuration data and other data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a destination machine may be synchronized with source data via an API. The API may include a function for specifying a set of source data, a function for specifying the destination machine, a function for specifying a type of synchronization, and a function for synchronizing the source data to a destination machine. The source data is deployed to a service of the destination device for synchronizing the destination machine, e.g., configuring that machine.

In general, the API allows various content, configuration data and/or database data, as well as other types of data, to be grouped as the source data in a single unit (object). The API handles communication with a service/agent on the destination machine that configures that destination machine based on the source data. In this manner, a user only need specify the source object, the destination, and the type of deployment, and then request the synchronization.

In one aspect, the API comprises various functions for various types of deployment. Such functions may include a function for packaging web applications, a function for deploying a web application, a function for synchronizing a website, a function for deploying archive data, and/or a function for deploying manifest data.

In one aspect, the synchronization takes place via a protocol that sends metadata corresponding to actual data to the destination machine, receives a response from the destination machine that indicates what actual data is needed for synchronization, sends the corresponding actual data to the destination machine, and receives status information from the destination machine. The status information may be in the form of one or more events.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards performing deployment, synchronization and backup operations using a set of defined functions and interfaces, referred to herein as an API. The API allows grouping together a list of objects for which a network administrator or web developer wants to perform such operations. Various benefits are obtained via the API, including the ability to group together multiple objects into a single unit and perform operations on that unit without needing to do special work based on the object's type. Also provided is the ability to package web applications into a compressed (e.g., zip) file using an API, the ability to deploy an entire web application including content, configuration data and database data to a server using an API, and the ability to synchronize an entire server or custom set of objects using an API.

While Microsoft® Internet Information Services (IIS, comprising various Internet-based services for servers) is used as an example relating to some of the information that may be synchronized from a source machine to one or more destination machines with this technology, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and data deployment in general.

Figure 1:
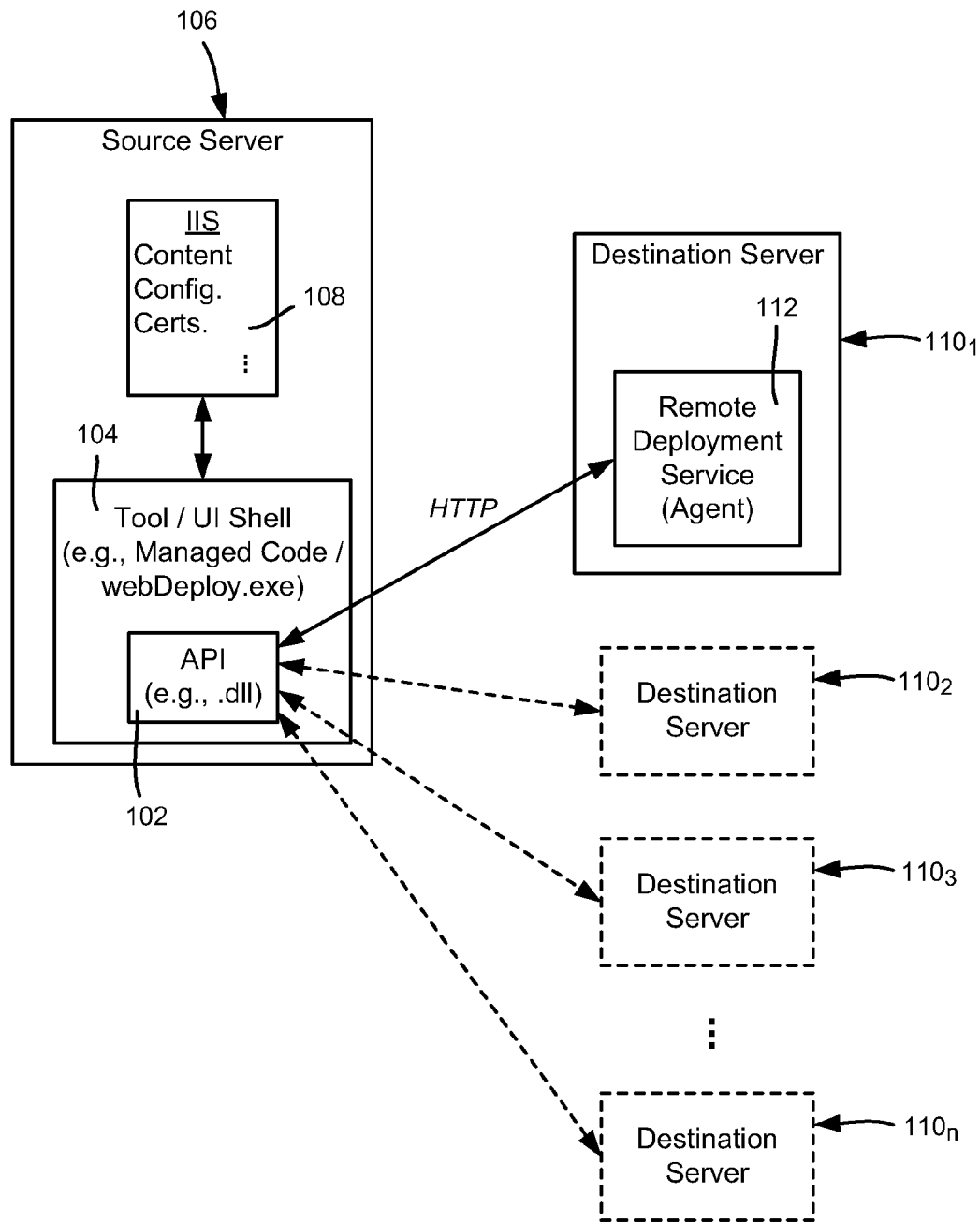
FIG. 1 is a block diagram showing example components including a set of functions/interfaces (an API) for synchronizing a destination to a source in a web deployment scenario.

FIG. 1 shows various aspects related to a set of functions (in one embodiment comprising an API 102) which makes it far easier for server administrators and web developers (users) to perform many of the various tasks needed to manage and otherwise administer a network. Among other aspects, the API 102 allows creation of a deployment unit that contains a set of objects that a user defines. As one example a user may define a unit that contains a web site, content files, assemblies in a global assembly cache, a SQL database and/or a registry key, and then perform operations against this unit.

While numerous ways to call the API functions of the API 102 may be used, one is via a tool 104 or the like that provides a user interface (UI) shell as generally represented in FIG. 1. As also represented in FIG. 1, the tool may be run on a source server or the like, which may then deploy various content, configuration data, certificates and so forth, such as in the IIS deployment unit 108, to one or more destination servers $110_1$-$110_n$.

Note that existing solutions require the user to write code for custom handling of each of these data types. Thus, for example, the user needs to write or use one set of code that understands SQL, and another set of code that understands IIS. Heretofore, the user also needs to bring together these concepts in order to treat everything as a single unit. In contrast, as generally described in the aforementioned related U.S. patent application, the API 102 allows the user to understand and operate on these objects together as a unit, without needing to write any custom logic based on the object's type.

Moreover, the API 102 uses an underlying remoting technology, whereby the user does not need to deal with having to have ports open on the remote machine, or have something to receive the "deployment unit" that is being used. Moreover, the data being transferred may correspond to operations that need to be performed on the destination server.

To this end, each destination server $110_1$-$110_n$ includes an agent, comprising a remote deployment service, which listens for HTTP deployment commands at its specific URL. In FIG. 1 only one such agent/remote deployment service 112 for the server $110_1$ is shown, however it is understood that each other destination server $110_2$-$110_n$ similarly has such an agent. In general, the API 102 and remote deployment service 112 work to push the unit 108 to the destination server $110_1$, such as serialized for transmission via an HTTP post command, in the form of a zip file or folder structure, for example. The remote agent/remote deployment service 112 takes actions to have any operations that are identified in the data performed on the destination. In this manner, the destination is synchronized to the source; note that information of the status, such as any configuration errors that may have occurred, is returned.

In one aspect, the API set enables a way of reading from and writing to other data sources than those that are already understood. To this end, any developer may create a "provider" that can read/write a specific data source without being required to write any of the underlying subsystem. Any new data source can be understood and added.

In general, the API set can determine what is needed before 'deploying' a data source. For example, deploying a web site that relies on having ASP.NET present on the target machine ordinarily requires that someone look for and install this manually. With the API set, a dependency between data sources may be specified, and warning before deploying if the dependency is not satisfied, resolving the problem by enabling, installing and/or copying the dependency, and/or taking custom actions such as writing to an event log.

The API set can report detailed events about its progress. Existing methods require a lot of work to determine their progress and status, any errors that occurred, how long an operation may take, and so forth. These are handled by the API set and are something that can be proactively watched or simply written to an event log for later consumption. They can also be used to take action; for example, when an event is raised, it may trigger another action to take before continuing the 'deployment' operation.

Figure 2:
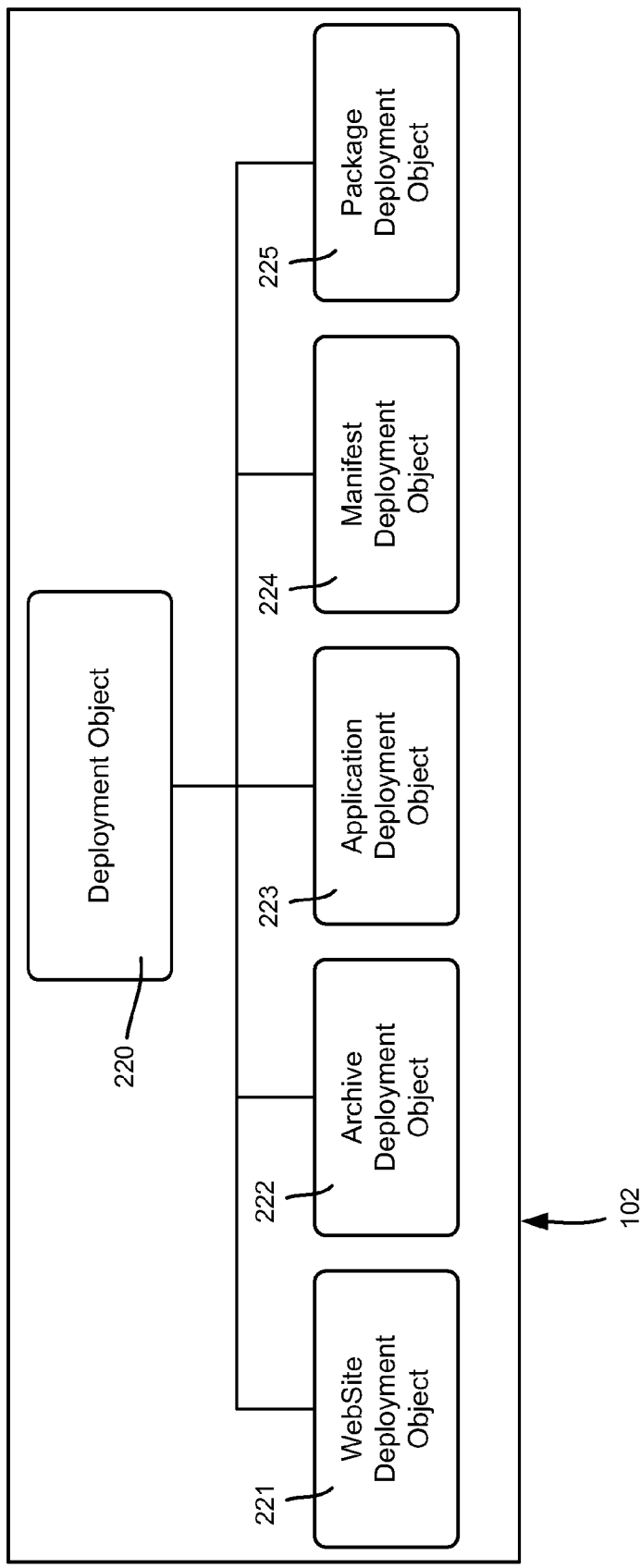
FIGS. 2-8 are representations of an example API, including methods, for use in performing web deployment scenario.
Figure 3:
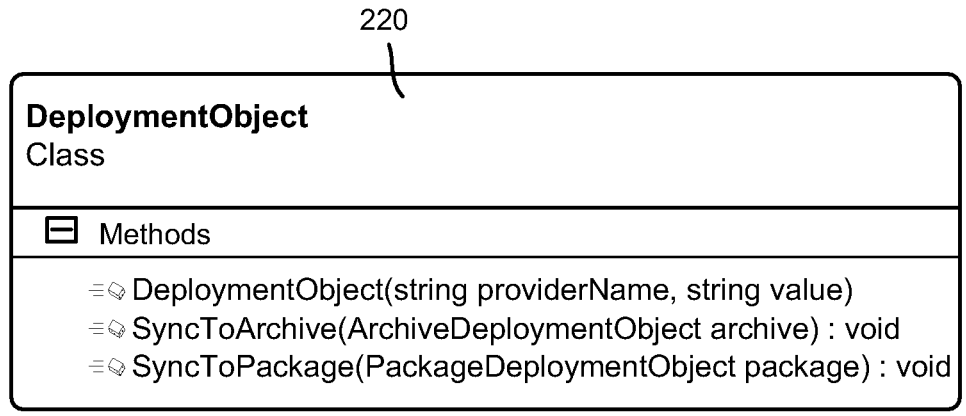
Figure 5:
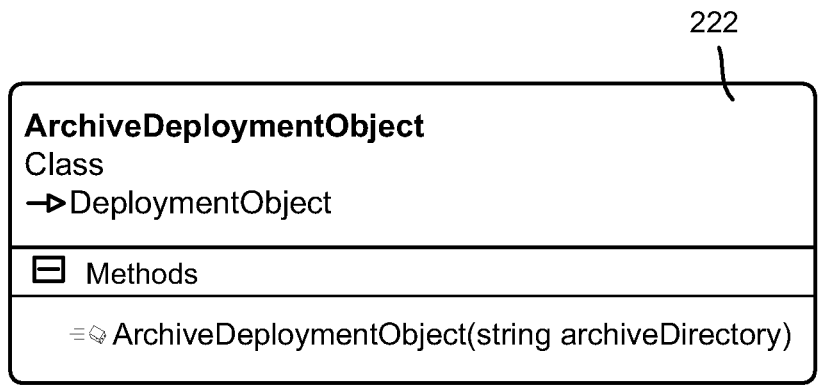
Figure 8:
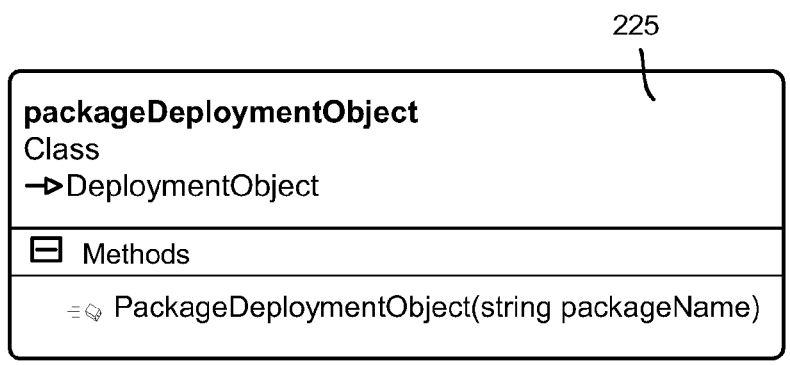

FIG. 2 shows one example implementation of the API 102, comprising objects 220-225. The deployment object 220, shown in more detail in FIG. 3, includes methods for naming, and for synchronizing for archiving deployment or package deployment purposes (also via methods of the objects 222/FIG. 5 and 225/FIG. 8, respectively).

Figure 4:
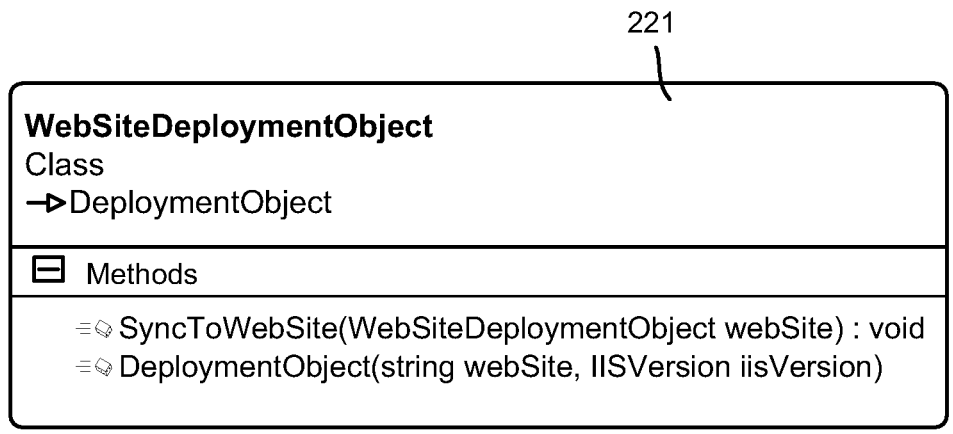
Figure 6:
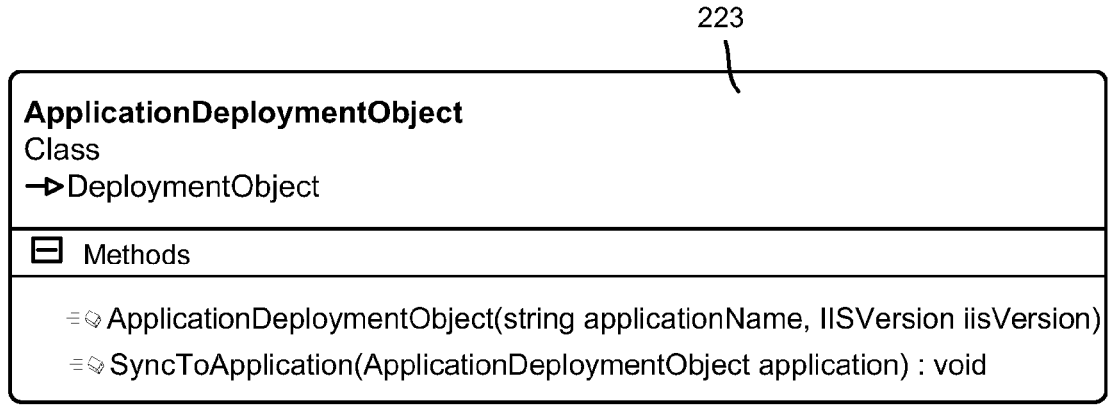
Figure 7:
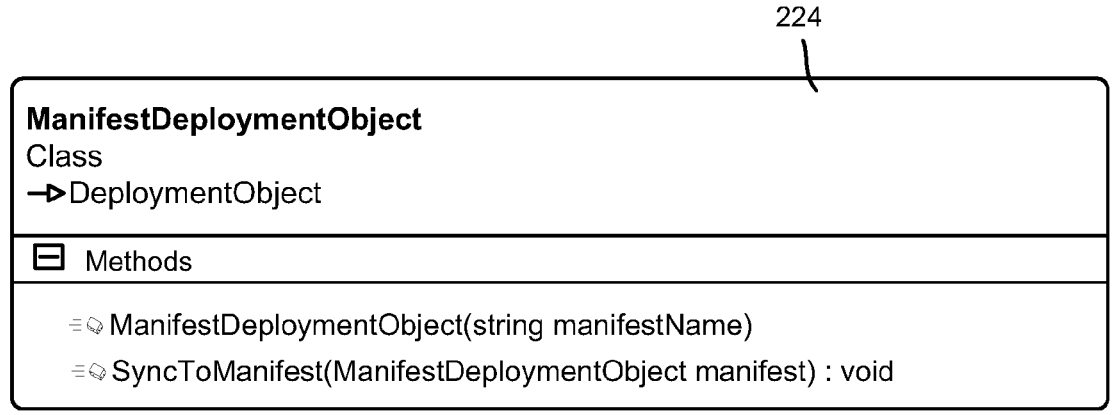

For synchronizing the defined unit to a website, the website deployment object 221 is used, such as including the exemplary methods shown in FIG. 4. FIG. 6 shows exemplary methods of the application deployment object 223, and FIG. 7 shows the exemplary methods of the manifest deployment object 224.

By way of an example, consider a user that wants to add another set of IIS servers to handle increased load. The user does not want to configure each new server separately, copy its content, and so forth. Via the API 102, such as called by the shell/tool 104, the user can deploy data to synchronize the one or more destination servers with a source.

Figure 9:
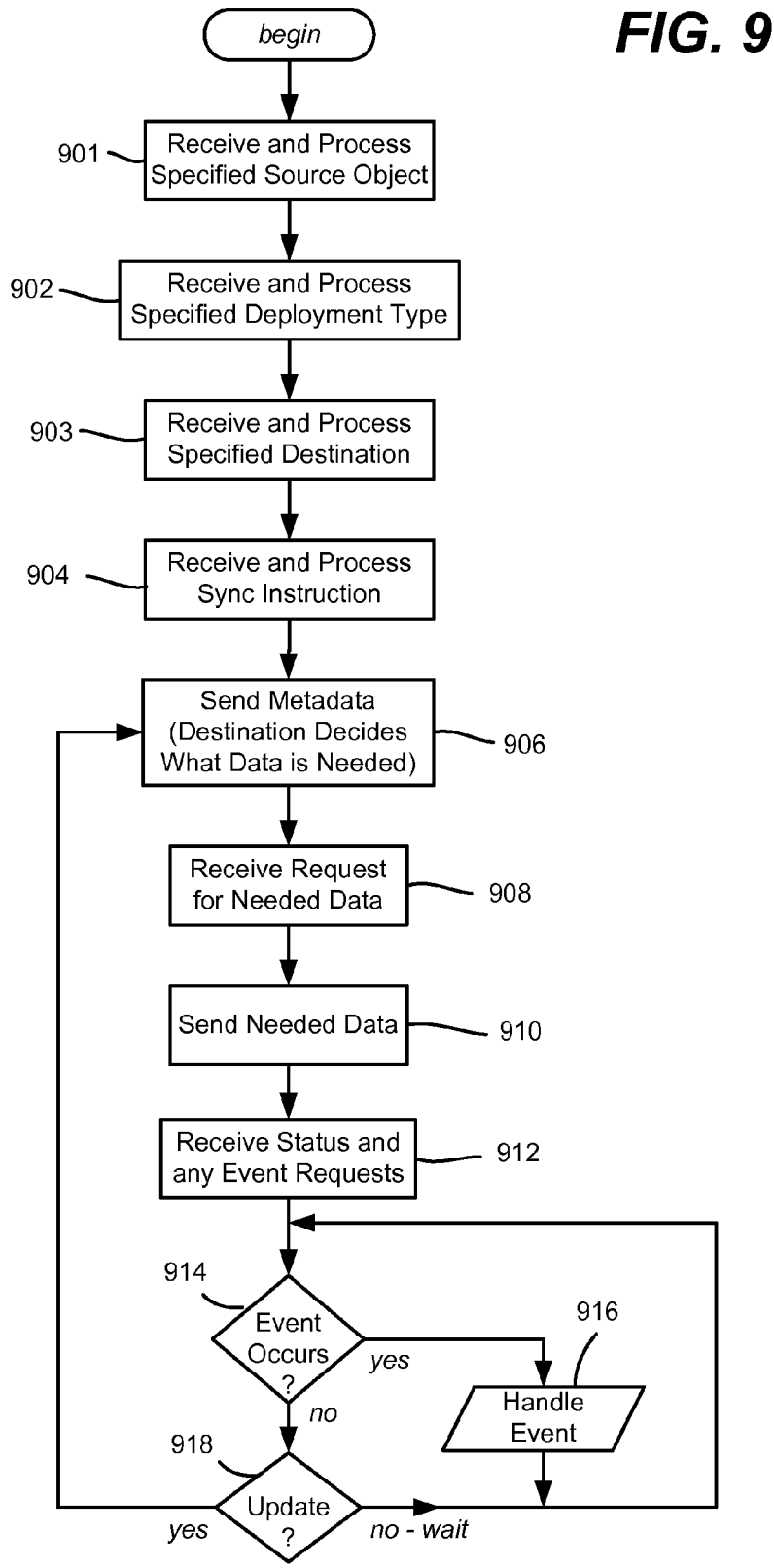
FIG. 9 is a flow diagram showing example steps taken to synchronize a destination to a source in a web deployment scenario.

For example, via simple script, the user can create and specify the source object to synchronize, specify the type of deployment (e.g., make a new web server via the object) so as invoke the correct API/method, and specify the deployment destination (e.g., the computer location/name). FIG. 9 shows these first three definitions via steps 901-903 from the perspective of the source machine to one destination machine. The synchronization step, also written in simple script, is shown as step 904. Note that various parameters are available to give the user more control, e.g., to specify whether the location of the source data (which may be " " indicating the local machine), to specify that only certain files need to be synchronized, and so forth.

Step 906 represents sending the synchronize command (e.g., an HTTP post command) with the data serialized. However, as one alternative to improve efficiency, in general only the differences (deltas) need to be provided to the destination. Thus, before sending the actual data corresponding to the source object/unit, the source sends metadata to the destination, from which the destination decides what is needed. For example, the metadata may identify the various files (and/or other data structures) to be sent by name, timestamp and so forth.

In the example of a newly provisioned server, the destination needs all the data to get itself configured and up and running. Once provisioned, however, the destination only needs updates to the files. Thus, step 908 receives information (e.g., in an HTTP response) corresponding to the data that the destination server needs, which may be all or some subset of the data. Step 910 sends the actual data that is needed (e.g., in another HTTP message), and step 912 receives the status of what the destination did, e.g., its actions, success or any failure reason. Note that these multiple communications takes place via the single synchronize command in the script.

In one aspect, the destination may provide the status and/or other information via events. Steps 914 and 916 represent event receipt and handling. The user can handle such events as desired, e.g., via additional script.

Step 918 represents waiting until the next update. Although shown as a loop in FIG. 9 for purposes of illustration, it is understood that any event, change, schedule, and so forth may trigger an update.

Still further, it can be readily appreciated that the API is extensible. A user can define and add its own custom objects. Examples include IIS user accounts, data from other (e.g., non-SQL) databases, and so forth.

Exemplary Operating Environment

Figure 10:
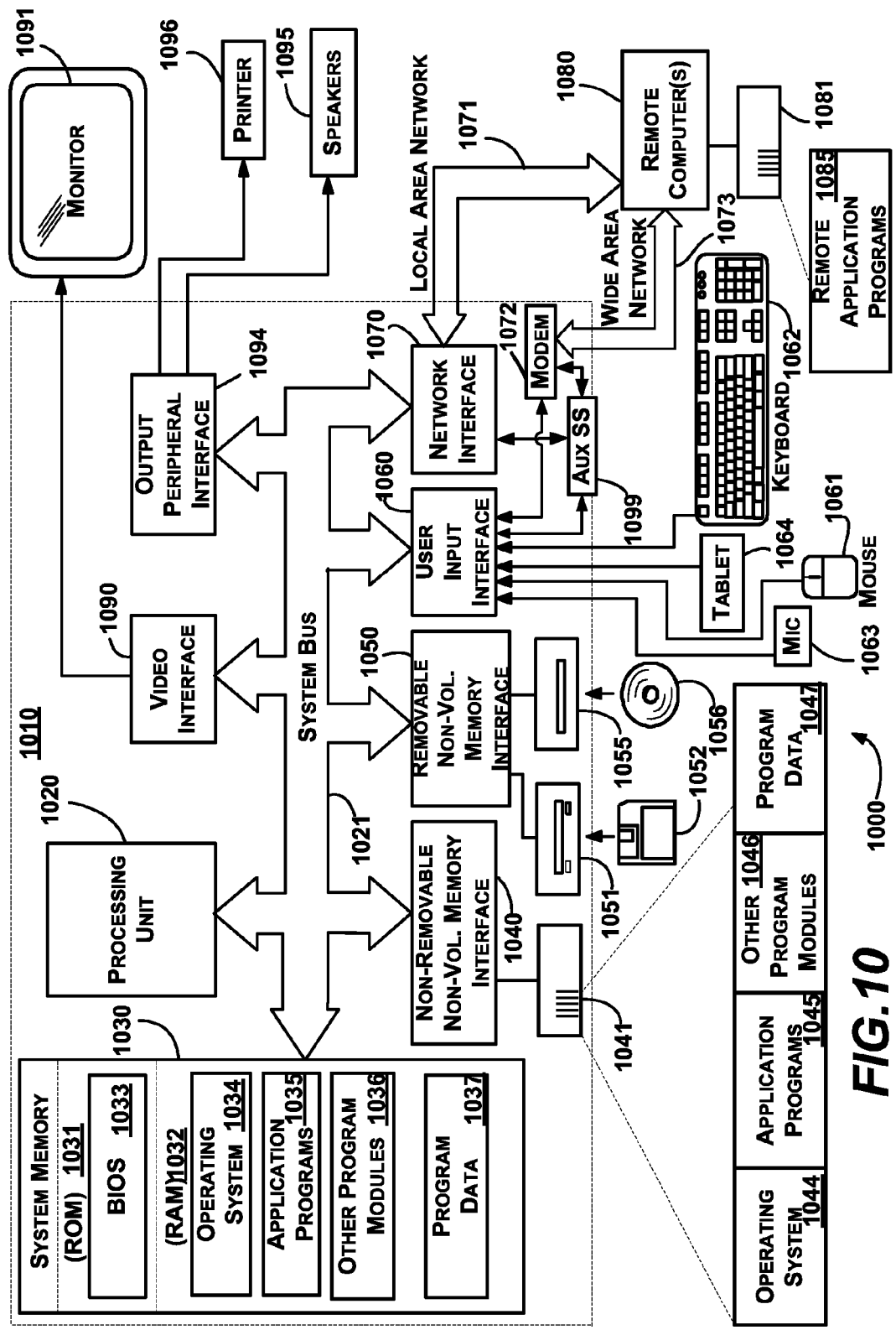
FIG. 10 shows an illustrative example of a computing environment into which various aspects of the present invention may be incorporated.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising, providing an API set of functions and associated interfaces, including a function for specifying a set of source data and a function for synchronizing the source data to a destination machine, receiving commands via the functions, and synchronizing the destination machine based upon the source data by deploying the source data to a service of the destination that synchronizes the destination machine, including sending metadata to the destination machine that corresponds to a portion of the source data prior to being sent to the destination machine, receiving a response from the destination machine that indicates what actual data of the source data is needed for synchronization, and sending the actual data to the destination machine.

2. The method of claim 1 wherein providing the API set comprises providing a function for specifying the destination machine.

3. The method of claim 1 wherein providing the API set comprises providing a function for deploying a web application to the destination machine, the web application including content, configuration data or database data, or any combination of content, configuration data or database data.

4. The method of claim 1 further comprising, reading from and writing to other data sources via a provider coupled to the API set.

5. The method of claim 1 wherein the API set determines whether the destination machine needs a prior configuration before deploying the source data, and if not present, providing a warning, configuring the destination machine, or taking a custom action.

6. The method of claim 1 further comprising providing events from the API set.

7. The method of claim 1 wherein providing the API set comprises providing a function for packaging web applications, providing a function for synchronizing a website to the destination machine, providing a function for deploying archive data to the destination machine, or providing a function for deploying manifest data to the destination machine, or providing any combination of a function for packaging web applications, a function for synchronizing a website to the destination machine, a function for deploying archive data to the destination machine, or a function for deploying manifest data to the destination machine.

8. The method of claim 1 wherein synchronizing the destination machine comprises serializing the metadata and the actual data, and sending the metadata and the actual data via HTTP commands.

9. The method of claim 1 further comprising, receiving status information corresponding to the synchronization from the destination machine.

10. The method of claim 9 wherein the status information corresponds to one or more events.

11. In a computing environment, a system comprising, at least one processor, a memory communicatively coupled to the at least one processor and including components comprising, an API having functions and interfaces, including a function for specifying a set of source data, a function for specifying a destination machine, a function for specifying a type of synchronization, and a function for synchronizing the source data to a destination machine, and a protocol for sending metadata to the destination machine that corresponds to source data, receiving a response from the destination machine that indicates updates to the source data that are needed for synchronization, and deploying the updates to the source data to a service of the destination machine for synchronizing the destination machine.

12. The system of claim 11 wherein the API comprises a function for deploying a web application to the destination machine, the web application including content, configuration data or database data, or any combination of content, configuration data or database data.

13. The system of claim 11 wherein the API comprises a function for synchronizing a website to the destination machine.

14. The system of claim 11 wherein the API comprises a function for packaging web applications, a function for deploying archive data to the destination machine, or a function for deploying manifest data to the destination machine, or any combination of a function for packaging web applications, a function for deploying archive data to the destination machine, or a function for deploying manifest data to the destination machine.

15. The system of claim 11 wherein the API is extensible with one or more additional functions and interfaces.

16. The system of claim 11 wherein the protocol sends the corresponding actual data to the destination machine, and receives status information from the destination machine.

17. One or more computer-readable storage media having computer-executable instructions, which when executed perform steps, comprising: providing an set of functions, including a function for specifying a set of source data and a function for synchronizing the source data to a destination machine, receiving commands via the functions, and synchronizing the destination machine based upon the source data by deploying the source data to synchronize the destination machine, including sending metadata to the destination machine that corresponds to actual data, receiving a response from the destination machine that indicates what actual data is needed for synchronization, combining at least two of content, configuration data or database data into the actual data, and sending the actual data to the destination machine.

18. The one or more computer-readable storage media of claim 17 wherein receiving a response further comprises receiving at least one event.

19. The one or more computer-readable storage media of claim 17 having further computer-executable instructions comprising providing a function for specifying the information, a function for synchronizing the source data to the destination machine, and a set of functions corresponding to a type of deployment, including a function for packaging web applications, a function for deploying a web application, a function for synchronizing a website, a function for deploying archive data, or a function for deploying manifest data, or any combination of a function for packaging web applications, a function for deploying a web application, a function for synchronizing a website, a function for deploying archive data, or a function for deploying manifest data.

\* \* \* \* \*